(12) United States Patent
Shang et al.

(10) Patent No.: US 10,871,971 B2
(45) Date of Patent: Dec. 22, 2020

(54) METHOD, ELECTRONIC DEVICE AND COMPUTER PROGRAM PRODUCT FOR DUAL-PROCESSOR STORAGE SYSTEM

(71) Applicant: EMC IP Holding Company LLC, Hopkinton, MA (US)

(72) Inventors: Rongrong Shang, Beijing (CN); Xiaobo Zhang, Beijing (CN); Haiying Tang, Beijing (CN); Jian Gao, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/512,641

(22) Filed: Jul. 16, 2019

(65) Prior Publication Data

US 2020/0026525 A1    Jan. 23, 2020

(30) Foreign Application Priority Data

Jul. 20, 2018   (CN) .......................... 2018 1 0803734

(51) Int. Cl.
| | | |
|---|---|---|
| *G06F 9/4401* | (2018.01) | |
| *G06F 9/50* | (2006.01) | |
| *G06F 9/38* | (2018.01) | |
| *G06F 9/46* | (2006.01) | |
| *G06F 9/30* | (2018.01) | |

(52) U.S. Cl.
CPC ........ *G06F 9/4411* (2013.01); *G06F 9/30007* (2013.01); *G06F 9/3877* (2013.01); *G06F 9/466* (2013.01); *G06F 9/5077* (2013.01); *G06F 2009/3883* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 8,972,656 | B1 * | 3/2015 | Armangau |
| 10,157,020 | B1 | 12/2018 | Taylor et al. |
| 10,444,994 | B2 | 10/2019 | Gao et al. |
| 10,496,333 | B2 | 12/2019 | Yang et al. |
| 2016/0077752 | A1 * | 3/2016 | Vanninen |

* cited by examiner

*Primary Examiner* — Syed A Roni
(74) *Attorney, Agent, or Firm* — BainwoodHuang

(57) ABSTRACT

In accordance with certain techniques, at a first processor of a dual-processor storage system, a change in an initial logical unit corresponding to a storage area in a physical storage device of the storage system is detected. Based on the change in the initial logical unit, a plurality of update operations to be performed on a mapped logical unit driver mapping a plurality of initial logical units including the initial logical unit to a plurality of mapped logical units are determined. An indication of the plurality of update operations is sent to a second processor of the storage system, to cause the second processor to perform the plurality of update operations on a peer mapped logical unit driver associated with the mapped logical unit driver.

18 Claims, 7 Drawing Sheets

METHOD, ELECTRONIC DEVICE AND COMPUTER PROGRAM PRODUCT FOR DUAL-PROCESSOR STORAGE SYSTEM

CROSS-REFERENCE TO RELATED APPLICATION

This application claims priority to Chinese Patent Application No. CN201810803734.1, on file at the China National Intellectual Property Administration (CNIPA), having a filing date of Jul. 20, 2018, and having "METHOD, ELECTRONIC DEVICE AND COMPUTER PROGRAM PRODUCT FOR DUAL-PROCESSOR STORAGE SYSTEM" as a title, the contents and teachings of which are herein incorporated by reference in their entirety.

FIELD

Embodiments of the present disclosure generally relate to a computer system or a storage system, and more particularly, to a method, an electronic device and a computer program product for a dual-processor storage system.

BACKGROUND

A dual storage processor (SP) storage system uses a pair of storage processors to control or manage the storage system, wherein the two storage processors can communicate with each other via a high-speed link. A host can attach to similar Input/Output (I/O) ports on the two storage processors to ride through a failure on one storage processor. When one storage processor fails, the other storage processor can take over work of the failed storage processor and the host can continue I/O operations on the storage system as if there had been no failures, thereby avoiding some performance loss. In the context of the present disclosure, a dual storage processor storage system can also be simply referred to as a dual-processor storage system.

However, traditional management solutions for the dual-processor storage system have problems in many aspects, such as poor performance, and thus cannot satisfy users' requirements in various application scenarios.

SUMMARY

Embodiments of the present disclosure relate to a computer-implemented method, an electronic device and a computer program product.

In a first aspect of the present disclosure, there is provided a computer-implemented method. The method includes: detecting, at a first processor of a dual-processor storage system, a change in an initial logical unit corresponding to a storage area in a physical storage device of the storage system. The method also includes: determining, based on the change in the initial logical unit, a plurality of update operations to be performed on a mapped logical unit driver mapping a plurality of initial logical units including the initial logical unit to a plurality of mapped logical units. The method further includes: sending an indication of the plurality of update operations to a second processor of the storage system, to cause the second processor perform the plurality of update operations on a peer mapped logical unit driver associated with the mapped logical unit driver.

In a second aspect of the present disclosure, there is provided an electronic device. The electronic device includes at least two processors and at least one memory including computer program instructions. The at least one memory and the computer program instructions are configured, with a first processor of the at least two processors, to cause the electronic device to: detect, at the first processor, a change in an initial logical unit corresponding to a storage area in a physical storage device of the storage system. The at least one memory and the computer program instructions are also configured, with the first processor, to cause the electronic device to: determine, based on the change in the initial logical unit, a plurality of update operations to be performed on a mapped logical unit driver mapping a plurality of initial logical units including the initial logical unit to a plurality of mapped logical units. The at least one memory and the computer program instructions are further configured, with the first processor, to cause the electronic device to: send an indication of the plurality of update operations to a second processor of the storage system, to cause the second processor to perform the plurality of update operations on a peer mapped logical unit driver associated with the mapped logical unit driver.

In a third aspect of the present disclosure, there is provided a computer program product tangibly stored on a non-volatile computer readable medium and including machine-executable instructions. The machine-executable instructions, when executed, cause a machine to perform steps of the method of the first aspect.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other objectives, features, and advantages of embodiments of the present disclosure will become easy to understand. Several embodiments of the present disclosure will be illustrated by way of example but not limitation in the drawings in which.

Throughout the drawings, same or similar reference numerals are used to represent same or similar components.

DETAILED DESCRIPTION OF EMBODIMENTS

Figure 1:
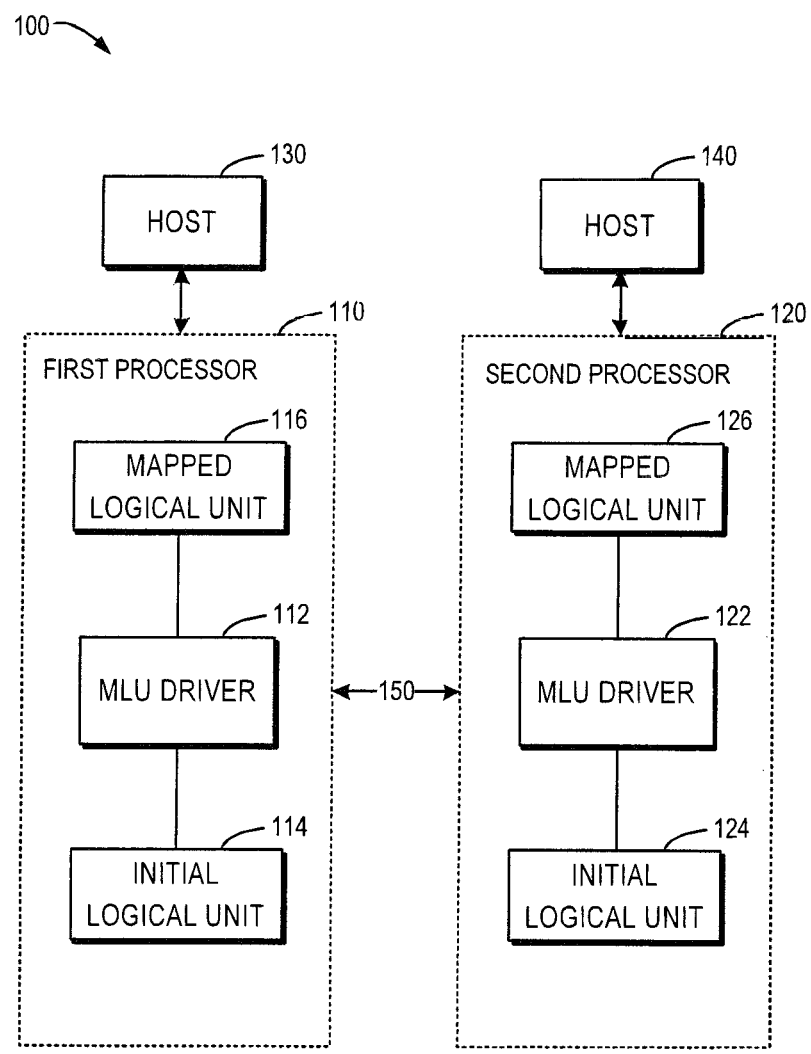
FIG. 1 illustrates a schematic block diagram of a dual-processor storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will be described with reference to various example embodiments illustrated in the drawings. It should be appreciated that description of those embodiments is merely to enable those skilled in the art to better understand and implement the present disclosure and is not intended for limiting the scope of the present disclosure in any manner.

FIG. 1 illustrates a schematic block diagram of a dual-processor storage system 100 in which embodiments of the present disclosure can be implemented. As shown in FIG. 1, the dual-processor storage system 100 includes a first processor 110 and a second processor 120. One of them can be referred to as a peer processor of the other and they can communicate via a high-speed link 150. A plurality of hosts 130, 140 and the like can access data stored in the dual-processor storage system 100 via the first processor 110 or the second processor 120.

At the first processor 110, a plurality of initial logical units (FLU), which correspond to storage areas of a physical storage disk and include an initial logical unit 114, can be mapped by a mapped logical unit (MLU) driver 112 to a plurality of mapped logical units including a mapped logical unit 116. For example, the MLU driver 112 consumes a plurality of initial logical units, slices and/or dices these them, and then outputs a plurality of mapped logical units, such as thin logical units (TLU).

Accordingly, the physical storage areas of the thin logical units are distributed across the plurality of consumed initial logical units. Because the storage areas of a thin logical units may be spread across the plurality of consumed initial logical units and intermixed with the storage areas of other thin logical units, when a thin logical unit having a plurality of initial logical units is broken away from the control of the first processor 110, the MLU driver 112 can provide dual-processor access to the plurality of initial logical units.

The MLU driver 112 can cooperate with other functions or modules in the dual-processor storage system 100 to implement pool-based storage objects and features, which storage objects and features are based on dynamically manipulating the mapping between physical storage locations and logical storage locations. Because this dynamic mapping supports resolving multiple logical locations to a single physical location, these components also form the basis for advanced data services, such as snapshots, compression and deduplication that are common for any type of storage object provisioned from a pool.

Additionally, as shown in FIG. 1, there is an initial logical unit 124, an MLU driver 122 and a mapped logical unit 126 at the second processor 120, which correspond to the initial logical unit 114, the MLU driver 112 and the mapped logical unit 116 at the first process 110. In some embodiments, the first processor 110 and the second processor 120 maintain synchronization between the peer units or modules by communications via the high-speed link 150.

It should be understood that the specific number of specific units, modules or components in the dual-processor storage system 100 described in FIG. 1 are only for example and are not intended for restricting the scope of the present disclosure in any way. In other embodiments, the dual-processor system 100 can include any suitable number of various possible units, modules or components. In other words, embodiments of the present disclosure can be generally applied to any appropriate dual-processor storage systems.

Figure 2:
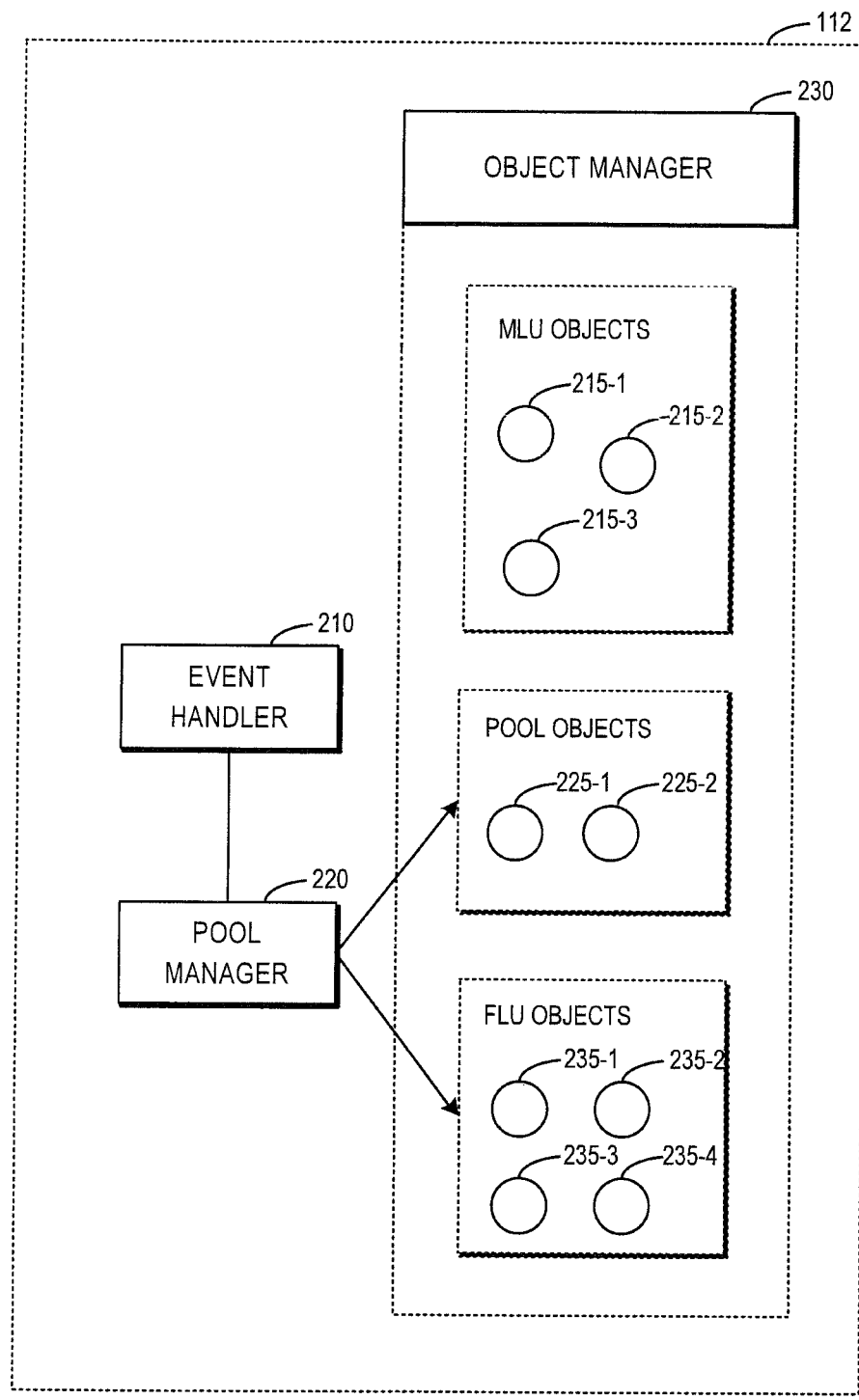
FIG. 2 illustrates a schematic block diagram of a mapped logical unit (MLU) driver in the dual-processor storage system.

FIG. 2 illustrates a schematic block diagram of the MLU driver 112 in the dual-processor storage system 100. As shown in FIG. 2, the MLU driver 112 can include various objects, such as MLU objects 215-1 to 215-3, pool objects 225-1 to 225-2 and FLU objects 235-1 to 235-4, which respectively are collectively referred to as the MLU objects 215, the pool objects 225 and the FLU objects 235.

In addition, the MLU driver 112 may include an event handler 210, a pool manager 220 and an object manager 230. The event handler 210 can handle events related to the MLU driver 112, such as update events of various objects, or the like. The object manager 230 can perform general management on various objects. The pool manager 220 can manage the pool objects 225 and the FLU objects 235.

For example, the pool manager 220 can manage FLUs in a pool, and thus it also can handle FLU-level events that affect the pool. As used herein, an event may refer to an asynchronous condition that affects an object in the pool manager 220. The pool manager 220 first registers for notification of events that need to be handled. When an event does occur, the pool manager 220 is notified and such notification can happen in arbitrary thread contexts.

An object in the MLU driver 112 is a well-defined collection of data that represents an entity or a process within the MLU driver 112 with a well-defined set of operations on it. Objects can be of two types, namely, persistent and non-persistent. The persistent objects exist on two processors 110 and 120 but are active on one processor at a time. The persistent objects are resurrected at the reboot or failure of the processor 110 or 120. The non-persistent objects are local objects that exist only on one processor and cease to exist on the reboot or failure of the processor. In some embodiments, the MLU objects 215, the pool objects 225 and the FLU objects 235 may be persistent objects.

Objects in the MLU driver 112 can be identified by a unique object identifier (OID) within the dual-processor storage system 100, and the identifier may act as a handle to the object. The object identifier may include two parts, namely, object class and object instance. All objects representing same entity or process may fall under the same object class, and all objects within one object class may own the same attributes and store the same information. An object instance is unique within a given object class.

As described above, there may be various types of objects in the MLU driver 112. For example, 66 object classes can be defined in some embodiments, such as file system objects, pool objects, file objects, virtual unit (VU) objects, snapshot objects, and the like. For some object classes, examples for object configuration are shown in Table 1 below. It can be seen from Table 1 that the number of objects in the MLU driver 112 may be huge.

TABLE 1

Example Configurations of Certain Object Classes in MLU Driver

| Object Class | Number of Objects |
|---|---|
| Pool | MaxPools = 40 |
| VU | MaxLUs = 4000 |
| Snapshot | MaxSnaps = 24000 |
| File System | MaxFileSystems = 1427 |
| File | MaxFiles = 49309 |
| Family | MaxFamilies = 10094 |
| LU Shrink | MaxLUShrinkObjects = 3000 |
| LU Expand | MaxLUExpandObjects = 3000 |
| Replication Session | MaxRep Sessions = 1000 |

In the example depicted in FIG. 2, the MLU objects 215 may refer to objects associated with a mapped logical unit. The FLU objects 235 may be used by the pool manager 220 for individual FLUs in the pool. A state machine of each of the FLU objects 235 can handle consumption of the FLU, obtain geometry and information of Redundant Array of Independent Disks (RAID) related to the FLU, and pass the FLU to a Slice Manager (not shown).

Each of the pool objects 225 may represent a user-level notion of a pool. The pool object holds properties associated with the pool and its state machine interacts with the FLU objects 235, to aggregate the states of the FLU objects 235 into an overall pool state. For example, each of the pool objects 225 may wait for all FLU objects 235 to reach a stable state before transitioning itself into a ready state.

It should be understood that the specific number of various objects depicted in FIG. 2 and the specific object types and the specific numbers described in the above are only for example and are not intended to limit the scope of the present disclosure in any manner. In other embodiments, the dual-processor storage system 100 or the MLU driver 112 may have any suitable number of objects of any appropriate types.

As described above, the MLU driver may map a plurality of initial logical units to a plurality of mapped logical units, and may mange such mapping via the MLU objects in the MLU driver. Therefore, when an initial logical unit changes, the MLU objects in the MLU driver may need to be updated accordingly to reflect the change in the initial logical unit. A traditional solution for updating the MLU objects and requesting the peer processor to perform synchronization will be described below with reference to FIG. 3.

Figure 3:
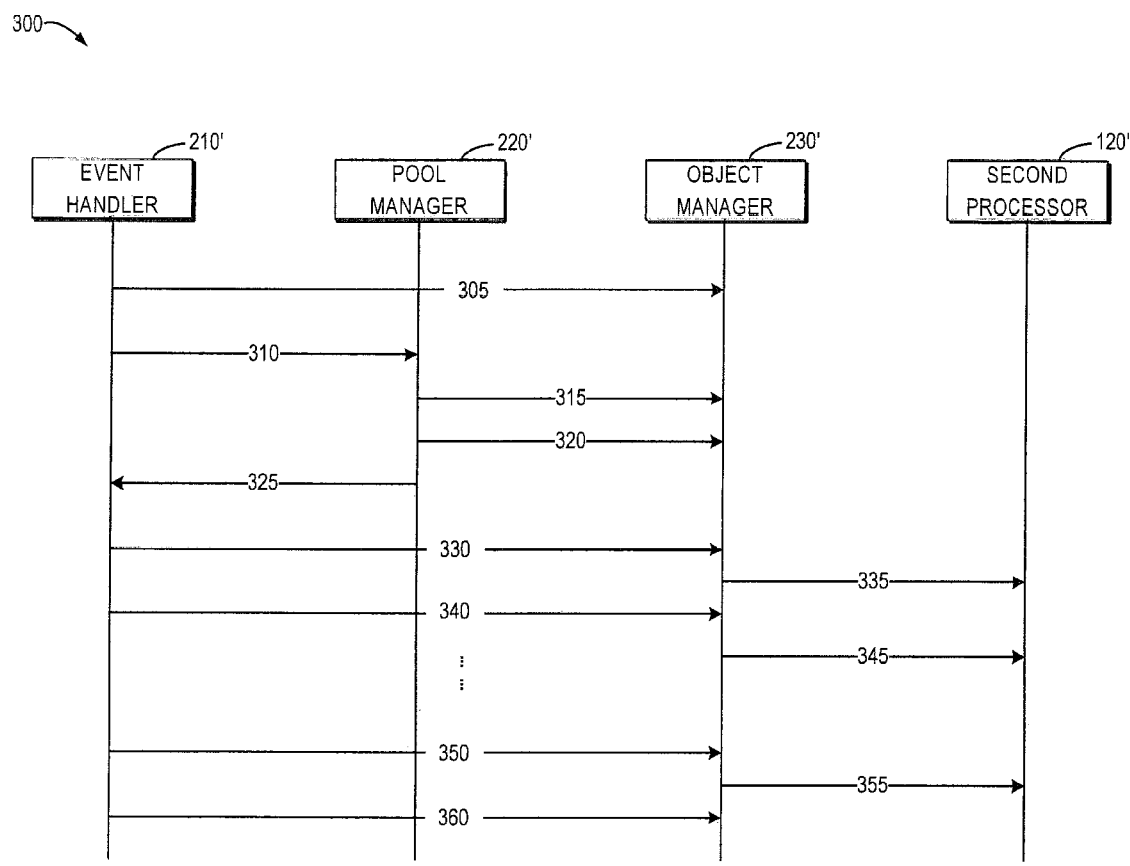
FIG. 3 illustrates an interaction diagram of a traditional update procedure of an MLU object in the dual-processor storage system.

FIG. 3 illustrates an interaction diagram of a traditional update procedure 300 of MLU objects in a dual-processor storage system. As shown in FIG. 3, if an initial logical unit changes, an event handler 210' indicates 305 an object manager 230' to start a transaction. The event handler 210' indicates 310 a pool manager 220' to calculate a pool property. The pool manager 220' sends 315 to the object manager 230' a request for accessing FLU objects. The pool manager 220' indicates 320 the object manager 230' to change properties of the FLU objects to reflect the change in the initial logical unit.

The pool manager 220' informs 325 the event handler 210' that the properties of the FLU objects have been changed. For example, the pool manager 220' calculates, based on properties of all FLUs, the property of the pool object, and returns "poolReadyChanged" indication or "poolAttrChanged" indication to the event handler 210'. If the state of the pool object is updated, "poolReadyChanged" may be true; and if the attribute of the pool object is updated, "poolAttrChanged" may be true.

Next, the event handler 210' notifies 330, for a first MLU object of the plurality of MLU objects, the object manager 230' of the change in the initial logical unit, and the object manager 230' accordingly sends 335, for the first MLU object, a synchronization request to the second processor 120'. Similarly, the event handler 210' notifies 340, for a second MLU object of the plurality of MLU objects, the object manager 230' of the change in the initial logical unit, and the object manager 230' accordingly sends 345, for the second MLU object, a synchronization request to the second processor 120'.

In a similar way, if there are N MLU objects need to be updated, the event handler 210' notifies 350, for the N-th MLU object, the object manager 230' of the change in the initial logical unit. The object manager 230' accordingly sends 355, for the N-th MLU object, a synchronization request to the second processor 120'.

After the notification to the object manager 230' respectively for the N MLU objects is completed and the object manager 230' accordingly sends the synchronization requests to the second processor 120', the event handler 210' commits 360 the transaction to the object manager 230' to perform the update on the N MLU objects. Correspondingly, the second processor 120' may notify the peer object manager of the peer MLU objects that need to be updated and the required update operations, and then perform the corresponding update operations.

Through research, the inventors find that in the above traditional solution for updating the MLU objects, the event handler needs to send a synchronization indication to the peer processor each time it requests a certain MLU object to perform an update. Moreover, in the traditional solution, the pool object synchronizes its tasks (and operations) via a mechanism provided by the object manager and all messages of the pool object between the two processors are managed by the object manager. Because the number of MLU objects may be huge, this will lead to a large amount of peer messaging during transaction commitment. In such a case, a transaction lock may expire due to a wait response timeout during the transaction commitment, which finally causes a failure of the dual-processor storage system.

In practice, the above problems have been tracked in some dual-processor storage systems, for example, there are up to 7553 objects in an actual MLU driver. When an initial logical unit became offline and comes back to be online again, each object needs to update its specific token (such as a "delta token") and sends a synchronization message to the peer processor as a part of the transaction commitment. In this situation, the update on thousands of objects finally exceeds the limit of the transaction lock timer, thereby causing an error of the storage processors.

In light of the above problems and other potential problems of the traditional solution, embodiments of the present disclosure provide a method, an electronic device and a computer program product for a dual-processor storage system. A basic idea of embodiments of the present disclosure is indicating a plurality of update operations that are needed to be performed on an MLU driver at a time or in a single message, so as to avoid sending a synchronization indication to a peer processor every time an MLU object is requested to perform an update. Particularly, in some embodiments, a pool object can synchronize its tasks (and operations) through a mechanism provided by a pool manager and all messages of the pool object between two processors can be managed by both an object manager and the pool manager. Embodiments of the present disclosure will be described in details below with reference to the drawings.

Figure 4:
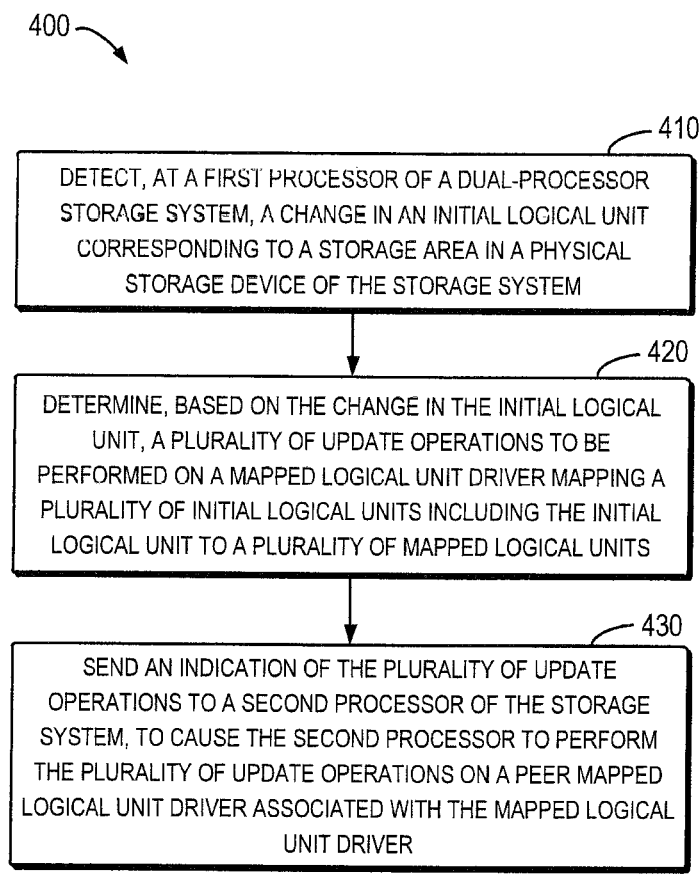
FIG. 4 illustrates a flowchart of a computer-implemented method according to embodiments of the present disclosure.

FIG. 4 illustrates a flowchart of a computer-implemented method 400 according to embodiments of the present disclosure. In some embodiments, the method 400 can be implemented by the first processor 110 of the dual-processor storage system 100, for example, the method 400 can be implemented by various units, components or modules which are implemented by the first processor 110. In other embodiments, the method 400 may also be carried out by other units, components or modules in the dual-processor storage system 100. For ease of discussion, the method 400 will be discussed with reference to FIGS. 1 and 2.

At block 410, a change in the initial logical unit 114 is detected at the first processor 110 of the dual-processor storage system 100. As mentioned above, the initial logical unit 114 may correspond to a storage area or location in a physical storage device of the dual-processor storage system 100. In some embodiments, the physical storage device used in the dual-processor storage system 100 can be any suitable physical storage device, such as a solid-state disk, a hard disk, a flash disk, or the like.

In some embodiments, the first processor 110 may determine a state change and/or an attribute change in the initial logical unit 114. For example, the state change in the initial logical unit 114 may include conversion between an online state and an offline state. The attribute change in the initial logical unit 114 may include a capacity change and the like. If the initial logical unit 114 becomes offline, the event handler 210 can invalidate the corresponding FLU object and set the FLU object in an error state. If the initial logical unit 114 becomes online, the event handler 210 can reset the FLU object, which can trigger other objects to wait for the FLU object to reach its target state. If the attribute of the initial logical unit 114 changes, the event handler 210 can obtain the current attribute and set it for the FLU object.

In this way, any change in the initial logical unit 114, which may affect the performance of the dual-processor storage system 100, can be reflected into the subsequent update on the MLU driver. It should be understood that the above only lists several examples of the state change and the attribute change in the initial logical unit 114 and is not intended to limit the scope of the present disclosure in any manner. In other embodiments, the change in the initial logical unit 114 detected by the first processor 110 can reasonably include any change that may cause an update on the MLU driver 112.

At block 420, the first processor 110 determines, based on the determined change in the initial logical unit 114, a plurality of update operations to be performed on the MLU driver 112. As mentioned above, the MLU driver 112 may map a plurality of initial logical units including the initial logical unit 114 to a plurality of mapped logical units including the mapped logical unit 116. In other words, it is required for the MLU driver 112 to implement and manage the mapping from the initial logical unit 114 to the mapped logical unit 116. Therefore, in case that the initial logical unit 114 changes, the MLU driver 112 may also need to be updated accordingly.

In the following, as an example of updating the MLU driver 112, updating of the MLU objects 215 in the MLU driver 112 will be specifically described. However, it will be appreciated that the update on the MLU driver 112 can generally include any required update for reflecting a change in the physical storage device. For example, such an update also may include updating of other objects (such as pool objects 225 and FLU objects 235) in the MLU driver 112.

In some embodiments, when determining the plurality of update operations to be performed on the MLU driver 112, the first processor 110 may determine a pool to which the initial logical unit 114 belongs. Because MLU objects in the pool are associated with the initial logical unit 114, the first processor 110 can determine a plurality of MLU objects in the pool. For example, the first processor 110 may search, via the event handler 210, registered MLU objects in the pool and insert them in a temporary list.

Then, the event handler 210 may traverse the temporary list to notify each MLU object of the change in the initial logical unit 114. That is, the first processor 110 may determine the plurality of update operations based on the plurality of determined MLU objects, namely, determining update operations which are needed to be performed on these MLU objects. In this way, the first processor 110 can accurately and efficiently determine the update operations to be performed on the MLU driver 112.

As an example, the first processor 110 may indicate, for each of the plurality of determined MLU objects, the change in the initial logical unit 114 to the object manager 230. Then, the object manager 230 can determine the update operations to be performed on these MLU objects, respectively. In this way, the update operations for a plurality of MLU objects can be determined by one unit in a centralized manner, which reduces the complexity. Such an example will be described in detail below with reference to FIG. 5.

Figure 5:
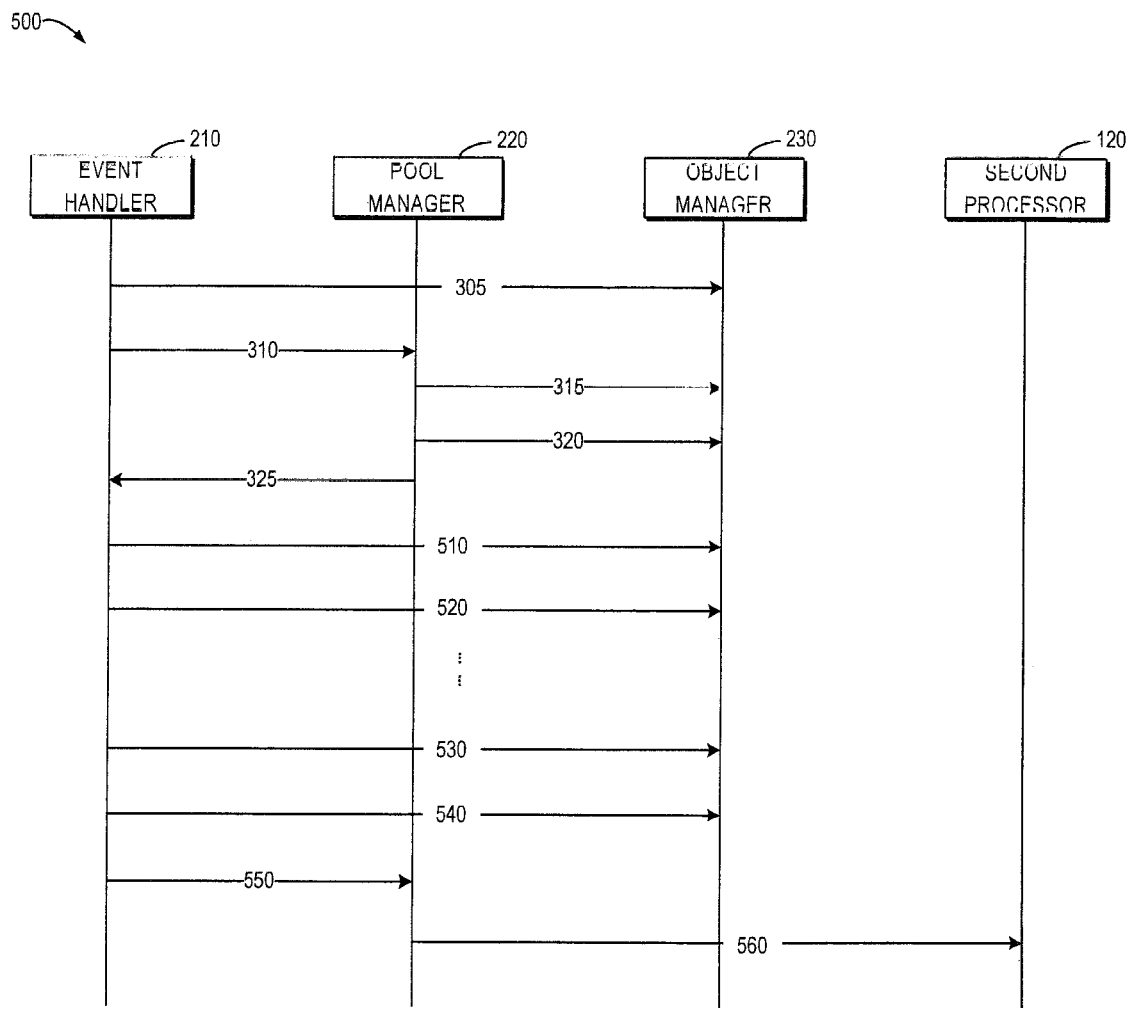
FIG. 5 illustrates an interaction diagram of an example update procedure of an MLU object in the dual-processor storage system according to embodiments of the present disclosure.

FIG. 5 illustrates an interaction diagram of an example update procedure 500 of the MLU object 215 in the dual-processor storage system 100 according to embodiments of the present disclosure. In FIG. 5, operations 305 to 325 are substantially identical or similar to operations in FIG. 3 and will not be repeated here.

Different from FIG. 3, the event handler 210 notifies 510, for a first MLU object of the plurality of MLU objects, the object manager 230 of the change in the initial logical unit 114, and the object manager 230 does not send a synchronization request to the second processor 120. Similarly, the event handler 210 notifies 520, for a second MLU object of the plurality of MLU objects, the object manager 230 of the change in the initial logical unit 114, and the object manager 230 does not send a synchronization request to the second processor 120. In a similar way, if N MLU objects are to be updated, the event handler 210 notifies 350, for an N-th MLU object, the object manager 230 of the change in the initial logical unit 114, and the object manager 230 does not send a synchronization request to the second processor 120.

Next, the event handler 210 commits 540 a transaction to the object manager 230. Then, the event handler 210 can instruct 550 the pool manager 220 to send a single message to the second processor 120, for indicating the update operations which are needed to be performed on the MLU objects. The pool manager 220 sends 560 the single message to the second processor 120. In some embodiments, the single message may include an identifier of an associated pool object.

As another example, when determining the update operations to be performed on the plurality of MLU objects, the first processor 110 may indicate the change in the initial logical unit 114 to a plurality of object managers corresponding to the plurality of MLU objects. In this case, the plurality of object managers may determine the update operations to be performed on the plurality of MLU objects, respectively. For example, the plurality of MLU objects may be of different types and the types of the MLU objects can be managed by different types of object managers, respectively. In this way, the update operations for the plurality of MLU objects can be determined by a plurality of dedicated units, respectively, thereby reducing the burden on the object manager 230. This is more suitable for a scenario where a large amount of MLU objects need to be updated. The example will be described in detail below with reference to FIG. 6.

Figure 6:
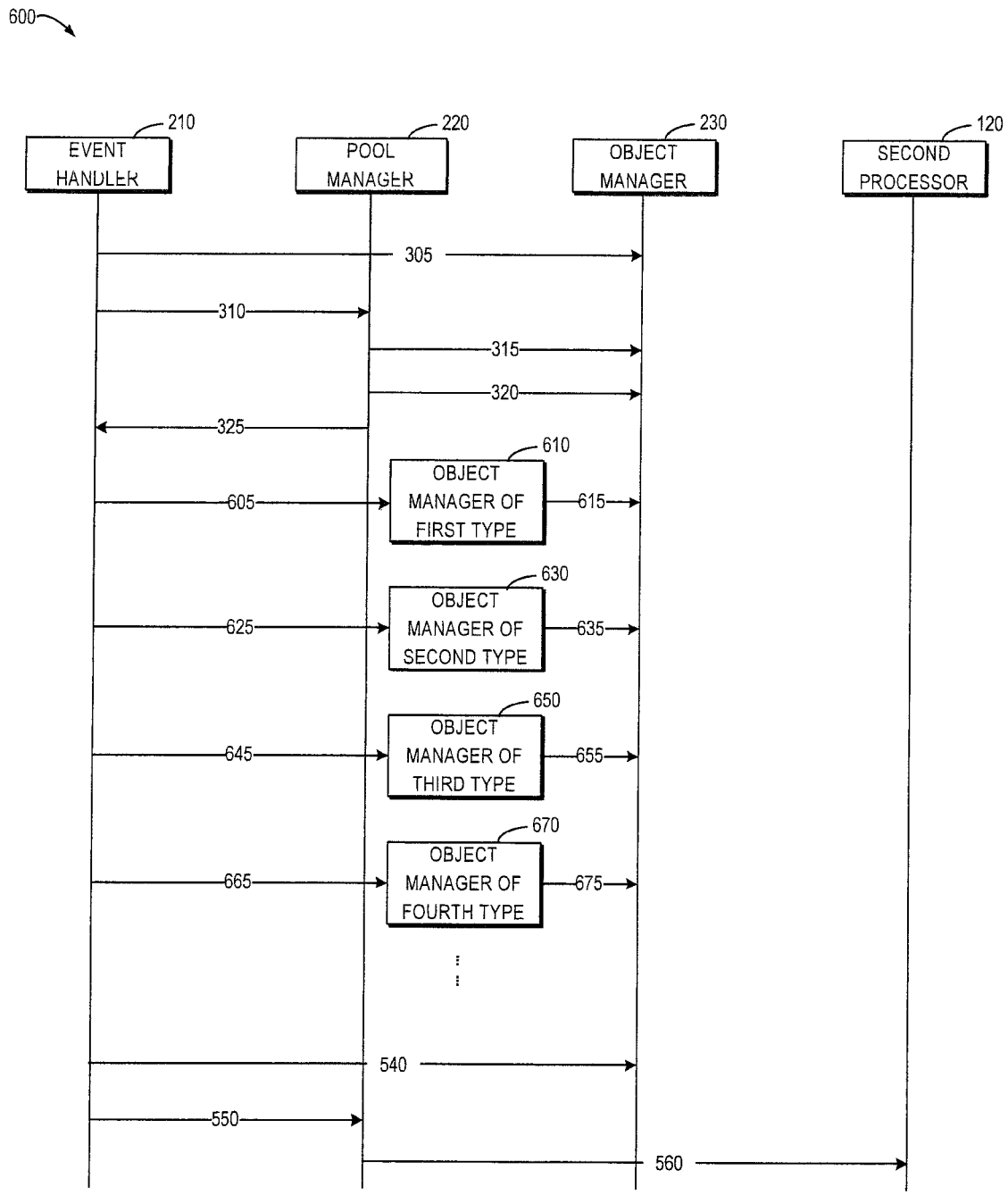
FIG. 6 illustrates an interaction diagram of another example update procedure of an MLU object in the dual-processor storage system according to embodiments of the present disclosure.

FIG. 6 illustrates an interaction diagram of another example update procedure 600 of the MLU object 215 in the dual-processor storage system 110 according to embodiments of the present disclosure. In FIG. 6, operations 305 to 325 are substantially identical or similar to operations in FIG. 3 and will not be repeated here. Operations 540 to 560 are substantially identical or similar to FIG. 5 and will also not be repeated here.

Unlike FIGS. 3 and 5, the event handler 210 notifies 605, for MLU objects of a first type, an object manager 610 of a first type of the change in the initial logical unit 114 and the object manager 610 of the first type subsequently determines the update operations, which are needed to be performed on the MLU objects of the first type (e.g., a particular label "delta token" of the objects needs to be updated), and sends 615 an update indication to the object manager 230.

In some embodiments, the label "delta token" supports a delta polling function. The object manager 610 can maintain the label "delta token" on each processor 110 and 120 and return a "token" value to a client during polling. Internally, the "delta token" is essentially a non-persistent counter that counts the number of times an object has changed on a certain storage processor. The "delta token" is initialized to an invalid token value (defined as 0) at startup and gets incremented every time the object on the certain storage processor is modified.

When the initial logical unit 114 changes, the event handler 210 notifies all related MLU objects of this change. Since the "delta token" needs to be incremented every time the object changes, updating the "delta token" is also one task for sending the notification to the related MLU objects.

Similarly, the event handler 210 notifies 625, for MLU objects of a second type, an object manager 630 of a second type of the change in the initial logical unit 114, and the object manager 630 of the second type subsequently determines the update operations, which are needed to be performed on the MLU objects of the second type (e.g., the particular label "delta token" of the objects needs to be updated), and sends 635 an update indication to the object manager 230.

Similarly, the event handler 210 notifies 645, for MLU objects of a third type, an object manager 650 of a third type of the change in the initial logical unit 114, and the object manager 650 of the third type subsequently determines the update operations, which are needed to be performed on the MLU objects of the third type (e.g., the particular label "delta token" of the objects needs to be updated), and sends 655 an update indication to the object manager 230.

Similarly, the event handler 210 notifies 665, for MLU objects of a fourth type, an object manager 670 of a fourth type of the change in the initial logical unit 114, and the object manager 670 of the fourth type subsequently determines the update operations, which are needed to be performed on the MLU objects of the fourth type (e.g., the particular label "delta token" of the objects needs to be updated), and sends 675 an update indication to the object manager 230.

In this example, the MLU objects of the first to fourth types can, for example, be virtual unit (VU) objects, snapshot objects, unified file system (UFS) objects, virtual data mover (VDM) objects, or the like. The object managers 610 to 670 for the first to fourth types can be VU object managers, snapshot object managers, UFS object managers, VDM object managers, or the like. In other embodiments, the MLU objects of the first to fourth types can be any other objects and the object managers 610 to 670 for the first to fourth types can also be any other types of object managers.

It should be understood that the specific number of MLU object types and the specific number of object managers 610 to 670 of different types depicted in FIG. 6 are only examples and are not intended to limit the scope of the present disclosure in any manner. In other embodiments, embodiments of the present disclosure can be suitable for any appropriate number of MLU object types and any appropriate number of object managers of different types.

Referring back to FIG. 4, at block 430, the first processor 110 sends to the second processor 120 an indication of a plurality of determined update operations, so as to cause the second processor 120 to perform the plurality of update operations on a peer MLU driver 122 associated with the MLU driver 112. For example, the first processor 110 may indicate in a single message the plurality of update operations to the second processor 120. Alternatively, the first processor 110 may also indicate in multiple messages the plurality of update operations to the second processor 120. In such a case, the number of the messages can be smaller than the number of the update operations. For a further example, the first processor 110 can also employ multiple messages simultaneously to send the indication of the plurality of update operations to the second processor 120 at a time.

In some embodiments, the first processor 110 may send the indication to the second processor 120 in response to committing the plurality of update operations in one transaction. For example, in the examples depicted in FIGS. 5 and 6, after the event handler 210 commits 540 the transaction to the object manager 230, the first processor 110 may send the indication to the second processor 120, which might be due to the fact that the objects can only be accessed in a transaction context in some cases. In this way, it can be ensured that the updates are indicated to the second processor 120 only if the plurality of update operations are performed at the first processor 110, thereby enhancing reliability of the dual-processor storage system 100.

In some embodiments, the first processor 110 can send, via the pool manager 220 in the MLU driver 112, the indication to the second processor 120, and the indication can include an identifier of a pool object corresponding to the pool to which the initial logical unit 114 belongs, such that the second processor 120 determines for which pool the update on the peer MLU driver 122 is to be performed. For example, in the examples depicted in FIGS. 5 and 6, the first processor 110 sends, via the pool manager 220, the indication to the second processor 120. In this way, the existing components in the MLU driver 112 can be fully utilized. In other embodiments, the first processor 110 may also send, via any other suitable units, components or modules, the indication to the second processor 120.

If the first processor 110 sends the indication via the pool manager 220, a new message can be therefore provided in the pool manager 220. Specifically, for this message, the associated request buffer and response buffer can be defined as follows, respectively:

```
typedef                                                    struct
_MLU_POOL_MGR_MSG_FLU_SCN_UPDATE_DELTA_TOKEN_REQUEST_BUFFER
{
ULONG32         RevisionId;
MLU_OBJECT_ID   ObjectId;
}
MLU_POOL_MGR_MSG_FLU_SCN_UPDATE_DELTA_TOKEN_REQUEST_BUFFER,
*PMLU_POOL_MGR_MSG_FLU_SCN_UPDATE_DELTA_TOKEN_REQUEST_BUFFER;
```

In this structure, "RevisionId" represents the revision at which the message is sent, while "ObjectId" represents an identifier of a pool object.

```
typedef                                                    struct
_MLU_POOL_MGR_MSG_FLU_SCN_UPDATE_DELTA_TOKEN_RESPONSE_BUFFER
{
ULONG32         RevisionId;
EMCPAL_STATUS   Status;
}
MLU_POOL_MGR_MSG_FLU_SCN_UPDATE_DELTA_TOKEN_RESPONSE_BUFFER,
*PMLU_POOL_MGR_MSG_FLU_SCN_UPDATE_DELTA_TOKEN_RESPONSE_BUFFER;
```

In this structure, "RevisionId" represents the revision at which the response is sent, while "Status" represents status for updating the "delta token" of the MLU object.

Compared to traditional solutions, embodiments of the present disclosure provide a new procedure of event handling for use in the dual-processor storage system (especially for a pool manager). When the pool manager receives changes in availability or attributes of an underlying physical storage device, the event handler can handle a plurality of update events using, for example, a single message alone.

Embodiments of the present disclosure can solve problems in the traditional solutions, especially the problem of excessive peer messaging due to the need of updating a large amount of MLU objects during transaction commitment, thereby reducing processing time of a transaction handler. In other words, embodiments of the present disclosure reduce the frequency of synchronization with the peer processor, which avoids excessive peer messaging during the transaction commitment and therefore improves the product performance of the dual-processor storage system.

The solution proposed by the embodiments of the present disclosure undertakes a running test in a typical configuration of the dual-processor storage system. In this configuration, the two storage processors are provided thereon with one pool object, five VU objects, one snapshot object, one VDM object, and three UFS objects. In the test, for the case that initial logical units become offline and come back to be online again, the time required for the two storage processors to update the particular label "delta token" of all objects is recorded in Table 2 below. From the test results recorded in Table 2, it can be seen that the solution proposed by the embodiments of the present disclosure effectively improve the performance of the dual-processor storage system. In particular, when the objects in the MLU driver increase, the performance improvement is more prominent.

TABLE 2

Test Result

| | |
|---|---|
| Time needed to update "delta token" of all objects in traditional solution | 130.5 ms |
| Time needed to update "delta token" of all objects in embodiments of the present disclosure | 19.3 ms |
| Improvement Percentage | 85% |

Figure 7:
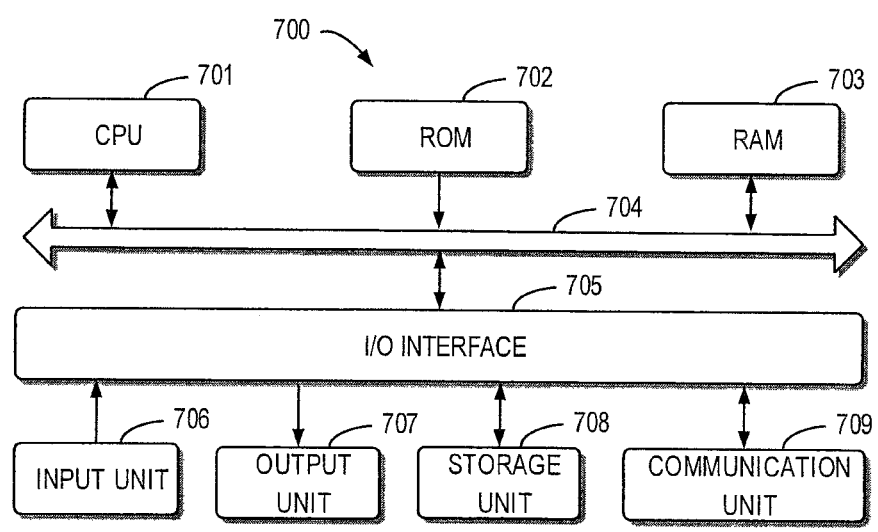
FIG. 7 illustrates a schematic block diagram of a device which can be used for implementing embodiments of the present disclosure.

FIG. 7 schematically illustrates a block diagram of a device 700 for implementing embodiments of the present disclosure. As shown in FIG. 7, the device 700 includes a central process unit (CPU) 701, which can execute various suitable actions and processing based on the computer program instructions stored in the read-only memory (ROM) 702 or computer program instructions loaded in the random-access memory (RAM) 703 from the storage unit 708. The RAM 703 can also store all kinds of programs and data required by the operation of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 707, such as keyboard, mouse and the like; an output unit 707, e.g., various kinds of display and loudspeakers or the like; a storage unit 708, such as disk and optical disk or the like; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as method 400, can be executed by the processing unit 701. For example, in some embodiments, the method 400 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, actions in one or more blocks of the above describe method 400 can be implemented.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." The terms "first", "second" and so on can refer to same or different objects. The following also can include other explicit and implicit definitions.

As used herein, the term "determine" encompasses a variety of actions, for example, "determine" can include computation, calculation, export, research, look up (such as looking up in a table, a database or a further data structure), and find out or the like. Additionally, "determine" can include receiving (e.g., receiving information), accessing (e.g., accessing data in the memory) and the like. Moreover, "determine" can include parsing, choice, selection and establishing or the like.

It should be noted that embodiments of the present disclosure can be implemented by hardware, software or combinations of software and hardware. The hardware portion can be implemented by special logic; the software portion can be stored in the memory executed by a suitable instruction execution system, such as microprocessor or dedicated design hardware. Those skilled in the art can understand that the above device and method can be implemented by using computer executable instructions and/or including in the control codes of the processor, e.g., providing such codes on the programmable memory or data carriers of optical or electronic signal carriers.

Further, although operations of the method of the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Additionally or alternatively, some steps can be omitted and a plurality of steps can be combined into one step for execution, and/or one step can be decomposed into a plurality of steps for execution. It should also be noted that features and functions of two or more apparatuses according to the present disclosure can be materialized in one apparatus whereas features and functions of one apparatus described above can be further divided and materialized by a plurality of apparatuses.

Although the present disclosure has been described with reference to several detailed embodiments, it should be understood that the present disclosure is not limited to the disclosed embodiments. The present disclosure is intended to cover various modifications and equivalent arrangements included in the spirit and scope of the appended claims. The scope of the appended claims meets the broadest explanations and covers all such modifications and equivalent structures and functions.

We claim:

1. A computer-implemented method, comprising:
    detecting, at a first processor of a dual-processor storage system, a change in an initial logical unit corresponding to a storage area in a physical storage device of the storage system;
    determining, based on the change in the initial logical unit, a plurality of update operations to be performed on a mapped logical unit driver mapping a plurality of initial logical units including the initial logical unit to a plurality of mapped logical units; and
    sending an indication of the plurality of update operations to a second processor of the storage system, to cause the second processor to perform the plurality of update operations on a peer mapped logical unit driver associated with the mapped logical unit driver;
    wherein determining the plurality of update operations to be performed on the mapped logical unit driver comprises:
        determining a pool to which the initial logical unit belongs;
        determining a plurality of mapped logical unit objects in the pool; and
        determining the plurality of update operations based on the plurality of mapped logical unit objects.

2. The method of claim 1, wherein detecting the change in the initial logical unit comprises:
    determining that at least one of a state or an attribute of the initial logical unit changes.

3. The method of claim 1, wherein determining the plurality of update operations based on the plurality of mapped logical unit objects comprises:
    for each of the plurality of mapped logical unit objects,
        indicating the change in the initial logical unit to an object manager at the first processor; and
        determining, by the object manager, an update operation to be performed on the mapped logical unit object.

4. The method of claim 1, wherein determining the plurality of update operations based on the plurality of mapped logical unit objects comprises:
    indicating the change in the initial logical unit to a plurality of object managers at the first processor corresponding to the plurality of mapped logical unit objects; and
    determining, by the plurality of object managers, update operations to be performed on the mapped logical unit objects respectively.

5. The method of claim 1, wherein sending the indication of the plurality of update operations to the second processor of the storage system comprises:
    sending the indication to the second processor in response to the plurality of update operations being committed in one transaction.

6. The method of claim 1, wherein sending the indication of the plurality of update operations to the second processor of the storage system comprises:
    sending, by a pool manager at the first processor, to the second processor the indication including an identifier of a pool object corresponding to a pool to which the initial logical unit belongs.

7. An electronic device, comprising:
    at least two processors; and
    at least one memory including computer program instructions, the at least one memory and the computer program instructions configured, with a first processor of the at least two processors, to cause the electronic device to:
        detect, at the first processor, a change in an initial logical unit corresponding to a storage area in a physical storage device of a storage system;
        determine, based on the change in the initial logical unit, a plurality of update operations to be performed on a mapped logical unit driver mapping a plurality of initial logical units including the initial logical unit to a plurality of mapped logical units; and
        send an indication of the plurality of update operations to a second processor of the storage system, to cause the second processor to perform the plurality of update operations on a peer mapped logical unit driver associated with the mapped logical unit driver;
    wherein the at least one memory and the computer program instructions are further configured, with the first processor, to cause the electronic device to:
        determine a pool to which the initial logical unit belongs;
        determine a plurality of mapped logical unit objects in the pool; and
        determine the plurality of update operations based on the plurality of mapped logical unit objects.

8. The electronic device of claim 7, wherein the at least one memory and the computer program instructions are further configured, with the first processor, to cause the electronic device to:
 determine that at least one of a state or an attribute of the initial logical unit changes.

9. The electronic device of claim 7, wherein the at least one memory and the computer program instructions are further configured, with the first processor, to cause the electronic device to:
 for each of the plurality of mapped logical unit objects,
  indicate the change in the initial logical unit to an object manager at the first processor; and
  determine, by the object manager, an update operation to be performed on the mapped logical unit object.

10. The electronic device of claim 7, wherein the at least one memory and the computer program instructions are further configured, with the first processor, to cause the electronic device to:
 indicate the change in the initial logical unit to a plurality of object managers at the first processor corresponding to the plurality of mapped logical unit objects; and
 determine, by the plurality of object managers, update operations to be performed on the mapped logical unit objects respectively.

11. The electronic device of claim 7, wherein the at least one memory and the computer program instructions are further configured, with the first processor, to cause the electronic device to:
 send the indication to the second processor in response to the plurality of update operations being committed in one transaction.

12. The electronic device of claim 7, wherein the at least one memory and the computer program instructions are further configured, with the first processor, to cause the electronic device to:
 send, by a pool manager at the first processor, to the second processor the indication including an identifier of a pool object corresponding to a pool to which the initial logical unit is belongs.

13. A computer program product having a non-transitory computer readable medium which stores a set of instructions to operate a dual-processor storage system; the set of instructions, when carried out by computerized circuitry, causing the computerized circuitry to perform a method of:
 detecting, at a first processor of the dual-processor storage system, a change in an initial logical unit corresponding to a storage area in a physical storage device of the dual-processor storage system;
 determining, based on the change in the initial logical unit, a plurality of update operations to be performed on a mapped logical unit driver mapping a plurality of initial logical units including the initial logical unit to a plurality of mapped logical units; and
 sending an indication of the plurality of update operations to a second processor of the dual-processor storage system, to cause the second processor to perform the plurality of update operations on a peer mapped logical unit driver associated with the mapped logical unit driver;
 wherein determining the plurality of update operations to be performed on the mapped logical unit driver comprises:
  determining a pool to which the initial logical unit belongs;
  determining a plurality of mapped logical unit objects in the pool; and
  determining the plurality of update operations based on the plurality of mapped logical unit objects.

14. The computer program product of claim 13, wherein detecting the change in the initial logical unit comprises:
 determining that at least one of a state or an attribute of the initial logical unit changes.

15. The computer program product of claim 13, wherein determining the plurality of update operations based on the plurality of mapped logical unit objects comprises:
 for each of the plurality of mapped logical unit objects,
  indicating the change in the initial logical unit to an object manager at the first processor; and
  determining, by the object manager, an update operation to be performed on the mapped logical unit object.

16. The computer program product of claim 13, wherein determining the plurality of update operations based on the plurality of mapped logical unit objects comprises:
 indicating the change in the initial logical unit to a plurality of object managers at the first processor corresponding to the plurality of mapped logical unit objects; and
 determining, by the plurality of object managers, update operations to be performed on the mapped logical unit objects respectively.

17. The computer program product of claim 13, wherein sending the indication of the plurality of update operations to the second processor of the storage system comprises:
 sending the indication to the second processor in response to the plurality of update operations being committed in one transaction.

18. The computer program product of claim 13, wherein sending the indication of the plurality of update operations to the second processor of the storage system comprises:
 sending, by a pool manager at the first processor, to the second processor the indication including an identifier of a pool object corresponding to a pool to which the initial logical unit belongs.

* * * * *